United States Patent Office 3,511,826
Patented May 12, 1970

3,511,826
DYESTUFFS CONTAINING 2-CHLOROTHIAZOLE- AND BENZTHIAZOLE-SULFONYL GROUPS
Roland Jean Dominique Tosan and Aimé Joseph Arsac, Condrieu, Fidèle Domenech, Saint-Clair-du-Rhone, Pierre Jules Emile Bourguignon, Lamorlaye, and Jean André Paul Kienzle, Creil, France, assignors, by mesne assignments, to Ugine Kuhlmann, Paris, France
No Drawing. Filed Jan. 10, 1962, Ser. No. 165,323
Claims priority, application France, Dec. 9, 1961, 881,507
Int. Cl. C09b 62/38, 62/40, 62/42
U.S. Cl. 260—146                4 Claims The present invention concerns new reactive dyestuffs and intermediate products, processes for their preparation and their uses.

It relates particularly to new reactive dyestuffs essentially characterised by the fact that they contain in their molecules one or more atomic groupings of the general formula:

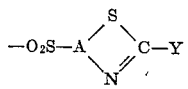

(I)

in which A represents the trivalent group

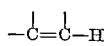

or a trivalent benzenic or naphthalenic radical and Y represents a halogen atom.

The radical A may be substituted by any substituents.

The dyestuffs possessing such a grouping are capable of being fixed by chemical reaction on textile fibres containing hydroxy or imino groups. This chemical reaction is due to the halogen atom Y which is capable of bringing about condensation between the dyestuff and the fibres containing the hydroxy or imino groups.

The dyestuffs containing in their molecules the group of the general Formula I may be prepared, for example, by the action of the corresponding sulphochloride

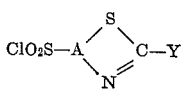

(II)

on organic dyestuffs containing one or more replaceable hydrogen atoms such as those of the hydroxy, mercapto, amino or monosubstituted amino groups, for example the monoalkylamino, mono-(hydroxyalkyl)-amino, mono-(alkoxy-alkyl)-amino and mono-(halogeno-alkyl)-amino groups. The amino groups may be directly connected to the nucleus of the dyestuff or indirectly through aliphatic chains.

The sulphochlorides of Formula II may be prepared, for example, by the action of chlorosulphonic acid on compounds of the formula:

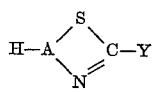

(III)

in which A and Y have the same meaning as given above, if desired in the presence of thionyl chloride. The sulphochlorides of Formula II are new and as such form part of the invention.

The organic dyestuffs containing replaceable hydrogen atoms are preferably selected from the water-soluble dyestuffs. They may belong to the most diverse classes, such as for example: Mono- or polyazo dyestuffs, anthraquinone dyestuffs, metallisable or metalliferous azo dyestuffs, or phthalocyanine derivatives.

The compounds of the present invention can be represented by the following structural formulae:

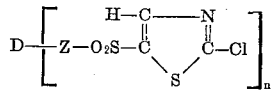

and

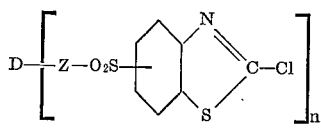

in which D represents the radical of a dyestuff DZH selected from the group consisting of the azo, anthraquinone, metalliferous azo and phthalocyanine series, Z represents a linkage selected from the group consisting of —O—, —S— and —NH—, and n represents an integer from 1 to 2 included..

The condensation of the dyestuff with the sulpho-chloride of Formula II may be carried out by known methods, but in such a manner that the halogen atom Y is not removed by hydrolysis. The reaction may be carried out in an aqueous medium or in an organic solvent. The condensation temperature may vary for example between 0° C. and 80° C. The reaction is, moreover, facilitated by the presence of acid-absorbing agents such as sodium carbonate, sodium acetate, sodium hydroxide or calcium hydroxide.

In the dyestuffs containing the atomic grouping of Formula I, the halogen atom Y is reactive. It is capable of bringing about condensation between the dyestuffs and the fibres containing —OH or —NH groups. The fibres may be of vegetable, animal, artificial or synthetic origin. Among suitable fibres are, for example, cotton, linen, hemp, wool, silk, leather, regenerated cellulose fibres, partially saponified cellulose acetate fibres and fibres based on polyamides. The present invention also includes a process for the colouration of textile fibres containing in their chemical structure a hydroxy or imino group which comprises applying thereto a dyestuff containing the atomic grouping (I) and submitting the fibres to a heat treatment.

The heat treatment is preferably effected in the presence of an acid-absorbing agent and the fibres may be impregnated with a solution or suspension of the dyestuff.

The impregnation may be effected by a dyeing, foularding or printing process. The heat treatment may be carried out during or after this impregnation, and preferably at a temperature between 60° C. and 170° C., for example by heating the dyebath or by immersion in a hot bath or by a steam treatment or by exposure to dry heat. The colourations obtained have excellent fastness to moisture. They are not removed by dimethylformamide even under heat and this demonstrates the existence of a chemical bond between the dyestuff and the fibre.

The following examples, in which the parts given are parts by weight unless otherwise indicated, illustrate the invention without limiting it.

EXAMPLE 1

(a) Process for the preparation of 2-chloro-benzothiazole sulphonyl chloride:

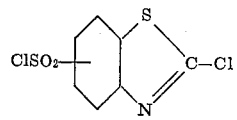

100 parts by volume of chlorosulphonic acid are introduced into an apparatus with stirrer and 40 parts of 2-chloro-benzothiazole are then added slowly. A white crystalline product which is the complex of 2-chlorobenzothiazole and chlorohydrin are thereby formed. The product is heated at 115° C. to 120° C. until there is no further liberation of hydrochloric acid, that is to say for about 6 to 7 hours. The reaction mixture is cooled and poured onto ice. The 2-chloro-benzothiazole sulphochloride thus obtained is in the form of a viscous and sticky product. The aqueous phase is siphoned off and the crude sulphochloride is dissolved by stirring into 200 parts by volume of diethyl ether. The esterified solution is dehydrated by passing over anhydrous sodium sulphate and the solvent is distilled off. 40 parts of a viscous oil are thereby obtained. The oil crystallises to form an oily crystalline mixture. The oil is removed by filtration and washing with petroleum ether and drying. 20 parts of 2-chlorobenzothiazole sulphochloride in the form of a white crystalline product are finally obtained. (b) A solution of 3 parts of 2-chloro-benzothiazole sulphochloride in 15 parts of acetone are added in the course of one hour to a solution of 5 parts of the disodium salt of 2-azo-benzene-1-hydroxy - 8 - aminonaphthalene-3,6-disulphonic acid in 100 parts of water at 30° C. to 35° C. At the same time, an aqueous solution of sodium carbonate is added with stirring to maintain the pH of the reaction mixture between 6 and 7. Stirring is continued for one hour. The dyestuff obtain is precipitated by the addition of sodium chloride, isolated by filtration and dried at 70° C. to 80° C. It corresponds to the formula:

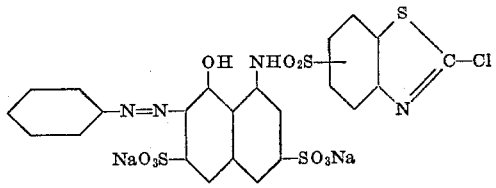

2 parts of this dyestuff are dissolved in 100 parts of water and then 10 parts of urea and 4 parts by volume of 36° Bé. sodium hydroxide are added. A cotton fabric is impregnated with this solution, wrung out, dried, heated for minutes at 150° C., then rinsed and saponified at boiling temperature. A red dyeing very fast to washing is obtained.

EXAMPLE 2

1 parts of the disodium salt of 1-amino-4'-amino-4-anilineanthraquinone-2,3'-disulphonic acid is dissolved by stirring in 20 parts of water. A solution of 0.54 part of 2-chlorobenzothiazole sulphochloride in 2.7 parts of acetone are introduced slowly with stirring. At the same time, small quantities of sodium bicarbonate are added to maintain the pH of the reaction mixture between 6 and 7. Stirring is continued in the cold for one hour. The dyestuff formed is precipitated by the addition of sodium chloride, filtered, and dried at 70° C. to 80° C. It corresponds to the formula

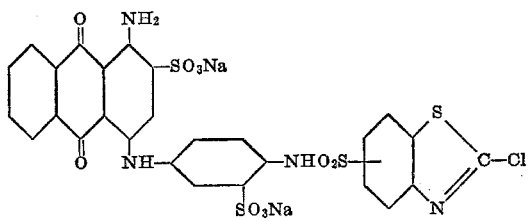

When applied to cotton by the same method as described in Example I, it gives a brilliant blue dyeing very fast to washing.

EXAMPLE 3

A solution of 26.8 parts of 2-chloro-benzothiazole sulphochloride in 70 parts of acetone is introduced in the course of 20 minutes with stirring into a solution heated to 55° C. of 31.9 parts of 1-amino-8-hydroxy-naphthalene-3,6-disulphonic acid in 200 parts of water, the solution having previously been brought to a pH of 6.5. The pH is maintained between 4 and 6 during the introduction of the benzothiazole by the gradual addition of a 10% aqueous solution of sodium acetate. Heating is then continued at 55° C. for one hour. The reaction product, which is readily soluble in water, may if desired be isolated by salting out for the purpose of subsequent coupling. Alternatively, however, the reaction solution may be used as such. In the latter case, it is cooled to 5° C., neutralized to pH 6.5 and added to 11 parts of anhydrous sodium carbonate. The diazo derivative prepared from 12.75 parts of o-chloroaniline is added in the course of 15 minutes and the reaction mixture is stirred at a temperature between 8° C. and 10° C. until coupling is complete. The mixture is acidified to pH 6 and the dyestuff is precipitated by the addition of sodium chloride. It is separated and dried at 60° C. to 80° C. This dyestuff dyes cotton a vivid bluish pink tint.

The same dyestuff may be prepared by condensing 2-chlorobenzothiazole-sulphochloride with 2'-chloro-1',7-azobenzene-1-amino - 8 - hydroxy-naphthalene-3,6-disulphonic acid.

EXAMPLE 4

If the diazo derivative used in Example 3 is that of 4-chloro-2-sulpho-aniline (20.4 parts) instead of that of o-chloroaniline, a dyestuff which dyes cotton vivid bluish red tints is obtained.

EXAMPLE 5

If the diazo derivative used in Example 3 is prepared from 17.9 parts of 2-hydroxy-4-chloroaniline, the resulting dyestuff dyes cotton reddish violet tints.

This dyestuff may be metallised, for example by heating to 60° C. with a solution of copper sulphate in a buffer medium such as acetic acid-sodium acetate. The copper complex obtained then produces on cotton a violet tint having good fastness to light and moisture.

EXAMPLE 6

18.8 parts of 1,3-diamino-benzene-4-sulphonic acid is dissolved in 220 parts of water and an aqueous 30% sodium hydroxide solution is added to produce a neutral pH. The mixture is heated to 50° C. to 60° C., and a solution of 26.8 parts of 2-chloro-benzothiazole-sulphochloride in 70 parts of acetone is added in the course of 30 minutes. At the same time, the pH is adjusted to 6 by the addition of an aqueous 20% sodium carbonate solution. The latter is added little by little. When all the sodium carbonate has been added, the temperature is kept at 50° C. for one hour. The reaction product is not isolated but kept in solution to be diazotised. This solution is introduced into a mixture comprising 20 parts of a solution of 30% hydrochloric acid and 200 parts of ice, and diazotised by the addition of 14 parts by volume of an aqueous 50% sodium nitrite solution. The suspension of diazo derivative is then allowed to flow slowly into a neutral solution of 32.3 parts of 2',5'-dichloro-4'-sulpho-1-phenyl-3-methyl-5-pyrazolone in 300 parts of water, and an aqueous 20% sodium carbonate solution is then added little by little to adjust the pH to about 8. The solution is then salted to 15% with sodium chloride to precipitate the dyestuff, which is kept stirred for one hour, and the precipitated dyestuff is then filtered off. The dyestuff gives on cotton a greenish yellow tint which is very fast to light and moisture.

EXAMPLE 7

23.9 parts of 2-amino - 5 - hydroxy - naphalene - 7 - sulphonic acid are dissolved in 150 parts of water and an aqueous 30% sodium hydroxide solution is added to adjust the pH to neutral. The mixture is heated to 55° C. and a solution of 26.8 parts of 2-chloro-benzothiazole in 70 parts of acetone is then added in the course of 30 minutes. An aqueous 10% sodium acetate solution is added simultaneously to keep the pH between 4 and 6. The condensation product is kept in solution and used for coupling. After the addition of 12 parts of sodium carbonate, the temperature of the solution is adjusted to 10° C. The suspension of diazo derivative prepared from 2-amino-4-chlorobenzene-1-sulphonic acid is then added. The dyestuff obtained produces on cotton a vivid orange tint having excellent fastness to moisture.

EXAMPLE 8

A solution of 24.5 parts of 1-amino-3'-amino-4-phenyl-amino-anthraquinone-2,4'-disulphonic acid in 1000 parts of water to which 15 parts of a 30% sodium hydroxide solution have been added is neutralised. It is heated to 55° C. and a solution of 13.4 parts of 2-chloro-benzothiazole-sulphochloride in 35 parts of acetone are added in the course of 30 minutes. At the same time, an aqueous 10% sodium acetate solution is added to maintain the pH between 4 and 6. The condensation product is precipitated by salting out with sodium chloride, filtered, drained and dried.

A fabric of cellulose fibres is coloured on a foularding machine with an aqueous solution of this dyestuff and the foularding is followed by a heat treatment in the presence of an alkaline reagent. A blue tint fast to light and moisture is obtained.

EXAMPLE 9

57.6 parts of copper phthalocyanine are introduced into 270 parts of chlorosulphonic acid at a temperature of 20° C. to 50° C. and the mixture is heated in the course of one hour to 140° C. and kept at this temperature for 3 hours. After cooling down to room temperature, the reaction mixture is poured on to 2000 parts of crushed ice and the precipitate is freed from moisture at 0° C. and washed with 3% hydrochloric acid. The precipitate is mixed with 500 parts of iced water and adjusted to pH 5 by the addition of a 3% aqueous sodium hydroxide solution. 15 parts of 1-amino-4-acetylamino benzene are added and the mixture is heated to 50° C. and the pH is maintained at 5.0 to 5.5 by the addition of a dilute solution of sodium hydroxide. At the end of 3 hours, the solution is made slightly alkaline and heated for one hour to 80° C. 200 parts by volume of an aqueous 30% solution of hydrochloric acid are then added and the mixture is kept at 70° C. to 80° C. until the acetyl group is eliminated. The amino compound which precipitates is filtered and washed with a little hydrochloric acid. The filter cake is dissolved in 300 parts of hot water and adjusted to pH 6 by adding a 30% aqueous sodium hydroxide solution. The mixture is heated to 50° C. to 55° C. and a solution of 25.8 parts of 2-chloro-benzothiazole-sulphochloride in 80 parts of acetone is added little by little. At the same time, a 20% aqueous sodium acetate solution is introduced to maintain the pH between 4 and 6. When this addition is completed, the temperature is kept for another hour at 55° C. and if necessary further aqueous sodium acetate solution is added to adjust the pH to about 6. When condensation is completed, the dyestuff is precipitated with the aid of sodium chloride. The dyestuff is filtered, dried and pulverised. It is in the form of a dark blue powder which dissolves in water to give a turquoise blue colour.

EXAMPLE 10

(a) Preparation of 5-chlorosulphonyl-2-chlorothiazole.

30 parts of 2-chlorothiazole are introduced in one hour and at a temperature of 70° C. into 150 parts of chlorosulphonic acid. The temperature is raised in the course of ½ hour to 140° C. This temperature is maintained for 1½ hours and the mixture is then cooled to 75° C., and 24 parts of thionyl chloride are then added in the course of 15 minutes while heating to 110° C. This temperature is maintained for one hour and the mixture is then cooled to 8° C. and the liquid reaction mixture is then poured on to a mixture of 600 parts of ice and 200 parts of di-ethyl ether. The product is decanted and the aqueous solution is extracted twice with 50 parts by volume of diethyl ether. The ester fractions are combined, the solution is neutralised to the turning point of Congo red and dehydrated by pouring on to calcium chloride. The mixture is filtered and the ester evaporated at normal pressure and then in vacuo. 16.5 parts of liquid residue of 5-chlorosulphonyl-2-chlorothiazole are obtained.

(b) 7.1 parts of 3'-methyl-1',2-azobenzene-1-hydroxy-6-amino-3-sulphonaphthalene are dissolved in 100 parts of water in the presence of sodium acetate to adjust the pH to about 4. After heating to 50° C., a solution of 4.4 parts of 2-chloro-5-chlorosulphonyl-thiazole in 10 parts of acetone are added little by little with stirring and at the same time a solution of 10% by weight of sodium acetate is added to keep the pH between 4 and 4.5. The temperature is then kept at 50° C. to 55° C. for one hour. No free amino groups are then present. The dyestuff is precipitated by salting out, filtered and dried. It dyes cotton an orange tint with excellent fastness to moisture.

EXAMPLE 11

13.6 parts of the copper complex of the dyestuff prepared by coupling the diazo derivative of 1-hydroxy-2-amino-benzene-4-sulphonic acid with 1-hydroxy-6-amino-naphthalene-3-sulphonic acid are treated as described in Example 10 with 4.4 parts of 2-chloro-5-chlorosulphonyl-thiazole. The dyestuff obtained dyes cotton a salmon tint fast to light and moisture.

The following three tables give examples of reactive dyestuffs prepared by condensing 2-chloro-benzothiazole-sulphochloride with azo dyestuffs containing one or two amino groups. The corresponding dyestuffs are mono- or di-reactive. Table I gives a list of the azo dyestuffs in which the amino group, substituted by the 2-chloro-benzothiazole-sulphonyl-radical is present in the coupling compound. Table II enumerates the azo dyestuffs in which the amino group substituted by the abovementioned reactive group is carried by the diazotised base. Table III gives examples of di-reactive dyestuffs.

TABLE I

| Ex. | Dyestuff | Metal complex | Tint on cotton |
|---|---|---|---|
| 12 | 1'-hydroxy-4'-sulpho-2',4-azobenzene-1-m-aminophenyl-3-carboxy-5-pyrazolone. | | Reddish yellow. |
| 13 | do | Copper | Yellowish brown. |
| 14 | 3',6'-disulpho-2',1-azonaphthalene-2-methyl-4-aminobenzene. | | Reddish yellow. |
| 15 | 3',6'-disulpho-2',6-azonaphthalene-1,3-diamino-4-sulphobenzene. | | Do. |
| 16 | 6',8'-disulpho-2',6-azonaphthalene-1,3-diamino-4-sulphobenzene. | | Do. |
| 17 | 6',8'-disulpho-2',1-azonaphthalene-2-methyl-4-aminobenzene. | | Yellow. |
| 18 | 6-azobenzene-2-amino-5-hydroxy-7-sulphonaphthalene. | | Yellowish orange. |
| 19 | 2'-methyl-1',6-azobenzene-2-amino-5-hydroxy-7-sulphonaphthalene. | | Reddish orange. |
| 20 | 3'-meteyl-1',6-azobenzene-2-amino-5-hydroxy-7-sulphonaphthalene. | | Orange |
| 21 | 4'-methyl-1',6-azobenzene-2-amino-5-hydroxy-7-sulphonaphthalene. | | Reddish orange. |
| 22 | 4'-methyl-1',6-azobenzene-1,3-diamino-4-sulphobenzene. | | Yellow. |
| 23 | 2'-sulpho-1',6-azobenzene-2-amino-5-hydroxy-7-sulphonaphthalene. | | Orange. |
| 24 | 3'-sulpho-1',6-azobenzene-2-amino-5-hydroxy-7-sulphonaphthalene. | | Do. |
| 25 | 4'-sulpho-1',6-azobenzene-2-amino-5-hydroxy-7-sulphonaphthalene. | | Do. |
| 26 | 2',5'-dichloro-1',6-azobenzene-2-amino-5-hydroxy-7-sulphonaphthalene. | | Do. |
| 27 | 2'-carboxy-4'-sulpho-1',6-azobenzene-2-amino-5-hydroxy-7-sulphonaphthalene. | | |

TABLE I—Continued

| Ex. | Dyestuff | Metal complex | Tint on cotton |
|---|---|---|---|
| 28 | 4'-acetylamino-1',6-azobenzene-2-amino-5-hydroxy-7-sulphonaphthalene. | | Scarlet red. |
| 29 | 2'-methoxy-1',6-azobenzene-2-amino-5-hydroxy-7-sulphonaphthalene. | | Scarlet. |
| 30 | 4'-chloro-2'-methoxy-1',6-azobenzene-2-amino-5-hydroxy-7-sulphonaphthalene. | | Yellowish scarlet. |
| 31 | 2'-nitro-1',7-azobenzene-1-amino-8-hydroxy-3,6-disulphonaphthalene. | | Bluish red. |
| 32 | 2'-nitro-4'-mithoxy-1',6-azobenzene-2-amino-5-hydroxy-7-sulphonaphthalene. | | Red. |
| 33 | 4'-methyl-2'-sulpho-1',7-azobenzene-1-amino-8-hydroxy-3,6-disulphonaphthalene. | | Red. |
| 34 | 2'-methyl-5'-chloro-1',6-azobenzene-2-amino-5-hydroxy-7-sulphonaphthalene. | | Orange. |
| 35 | 3',6'-disulpho-2',6-azonaphthalene-2-amino-5-hydroxy-7-sulphonaphthalene. | | Reddish orange. |
| 36 | 6',8'-disulpho-2',6-azonaphthalene-2-amino-5-hydroxy-7-sulphonaphthalene. | | Orange. |
| 37 | 4'-phenylamino-3'-sulpho-1',7-azobenzene-1-amino-8-hydroxy-3,6-sulpho-napthalene | | Reddish blue. |
| 38 | 4'-phenylamino-3'-sulpho-1',6-azobenzene-2-amino-5-hydroxy-7-sulphonaphthalene. | | Violet. |
| 39 | 2'-methoxy-1',7-azobenzene-1-amino-8-hydroxy-4,6-disulphonaphthalene. | | Reddish violet. |
| 40 | 1'-hydroxy-4'-sulpho-2',6-azobenzene-2-amino-5-hydroxy-7-sulphonaphthalene. | | Orange. |
| 41 | ...do... | Copper | Ruby. |
| 42 | ...do... | Chromium | Violet. |
| 43 | ...do... | Cobalt | Wine red. |
| 44 | 1'-hydroxy-4'-sulpho-2',7-azobenzene-2-amino-8-hydroxy-6-sulphonaphthalene. | | Ruby. |
| 45 | ...do... | Copper | Do. |
| 46 | 1'-hydroxy-4'-chloro-6'-sulpho-2',6-azobenzene-2-amino-5-hydroxy-7-sulphonaphthalene | | Violet. |
| 47 | ...do... | Copper | Reddish violet. |
| 48 | 1'-hydroxy-4'-sulpho-2',6-naphthalene 2-amino-5-hydroxy-7-sulphonaphthalene. | | Violet red. |
| 49 | ...do... | Copper | Reddish grey. |
| 50 | ...do... | Chromium | Bluish grey. |
| 51 | ...do... | Cobalt | Violet grey. |
| 52 | 1'-hydroxy-4'-sulpho-6'-nitro-2',6-azonaphthalene-2-amino-5-hydroxy-7-sulphonaphthalene. | | Violet red. |
| 53 | ...do... | Copper | Reddish grey. |
| 54 | ...do... | Chromium | Yellowish grey. |
| 55 | ...do... | Colbalt | Reddish grey. |

TABLE II

| Ex. | Dyestuff | Metal complex | Tint on cotton |
|---|---|---|---|
| 56 | 2''-chloro-4''-sulpho-1'-phenyl-3'-methyl-5'-oxo-4',1-azopyrazole-5-amino-2-sulphobenzene. | | Greenish yellow. |
| 57 | 4''-sulpho-1'-phenyl-3'-methyl-5'-oxo-4',1-azopyrazole-5-amino-2-sulphobenzene. | | Yellow. |
| 58 | 4''-sulpho-1'-phenyl-3'-carboxy-5'-oxo-4',1-azopyrazole-5-amino-2-sulphobenzene. | | Golden yellow. |
| 59 | 2''-chloro-4''-sulpho-1'-phenyl-3'-methyl-5'-oxo-4',1-azopryazole-5-amino-4-methyl-2-sulphobenzene. | | Yellow. |
| 60 | 5'-amino-2'-sulpho-1',2-azobenzene-1-hydroxy-4-disulphonaphthalene. | | Orange. |
| 61 | 5'-amino-2'-sulpho-1',2-azobenzene-1-hydroxy-4-sulphonaphthalene. | | Do. |
| 62 | 5'-amino-2'-sulpho-1',7-azobenzene-1-chloro-8-hydroxy-3,6-disulphonapthalene. | | Salmon. |
| 63 | 5-amino-2'-sulpho-1',6-azobenzene-2-benzoylamino-5-hydroxy-7-sulphonaphthalene. | | Yellowish orange. |
| 64 | 5'-amino-2'-sulpho-1',7-azobenzene-1-benzoylamino-8-hydroxy-3,6-disulphonaphthalene. | | Bluish red. |
| 65 | 2''-hydroxy-5''-sulpho-1'',1'-azobenzene-2',4'-dihydroxy-5',1-azobenzene-5-amino-2-sulphobenzene. | Copper | Reddish brown. |
| 66 | 2''-carboxy-5''-sulpho-1'',1'-azobenzene-2',4'-dihydroxy-5',1-azobenzene-5-amino-2-sulphobenzene. | ...do... | Do. |

TABLE III

| Ex. | Dyestuff | Metal complex | Tint on cotton |
|---|---|---|---|
| 67 | 5'-amino-2'-sulpho-1',6-azobenzene-2-amino-5-hydroxy-7-sulphonaphthalene. | | Orange brown |
| 68 | 4,4'-bis(2''-amino-5''-hydroxy-7''-sulpho-6''-azonaphthalene)-2,2'-disulpho-diphenyl. | | Scarlet. |
| 69 | 5'-amino-2'-sulpho-1',7-azobenzene-1-amino-2-hydroxy-3,6-disulphonaphthalene. | | Ruby. |
| 70 | 4,4'-bis(2''-amino-5''-hydroxy-7''-sulpho-6''-azonaphthalene)-2,2'-disulphostilbene. | | Violet. |
| 71 | 4,4'-bis(2''-amino-5''-hydroxy-7''-sulpho-6''-azonaphthalene)-3,3'-dimethoxydiphenyl. | | Navy blue. |
| 72 | ...do... | Copper | Violet. |

We claim:

1. A reactive dyestuff characterized by having one of the following formulae:

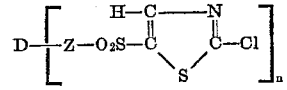

and

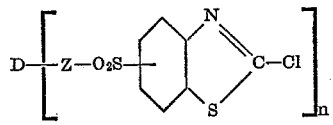

in which D represents the radical of a dyestuff DZH selected from the group consisting of the azo, anthraquinone, metalliferous azo and phthalocyanine series, Z represents a linkage selected from the group consisting of —O—, —S— and —NH—, and $n$ represents an integer from 1 to 2 included.

2. A dyestuff of the formula:

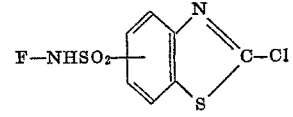

wherein F stands for the residue of a water-soluble organic azo dyestuff.

3. A dyestuff of the formula:

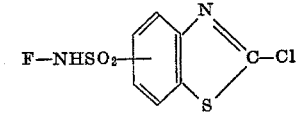

wherein F stands for the residue of a water-soluble organic phthalocyanine dyestuff.

4. A dyestuff of the formula:

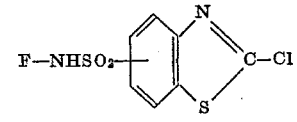

wherein F stands for the residue of a water-soluble organic anthraquinone dyestuff.

References Cited

UNITED STATES PATENTS

| 2,937,166 | 5/1960 | Kracker et al. | 260—158 |
| 3,007,915 | 11/1961 | Merian | 260—158 |
| 2,903,324 | 9/1959 | Hirsbrunner | 8—43 |
| 2,987,368 | 6/1961 | Bene | 8—43 |

FOREIGN PATENTS 1,290,839 3/1962 France.

FLOYD D. HIGEL, Primary Examiner

U.S. Cl. X.R.

8—12, 13, 39, 40, 41, 42, 43, 50, 51, 54, 54.2, 55; 260—158, 299, 302, 303, 306, 306.5, 306.6